2,951,080
NOVEL PHENYL-SUBSTITUTED PIPERIDINES

Albert Pohland, Indianapolis, Ind., assignor to Eli Lilly and Company, Indianapolis, Ind., a corporation of Indiana No Drawing. Filed Aug. 5, 1957, Ser. No. 676,431

1 Claim. (Cl. 260—294.3)

This invention relates to novel organic compounds, and more particularly to novel phenyl-substituted piperidines.

The novel piperidine bases of this invention can be represented by the following formula:

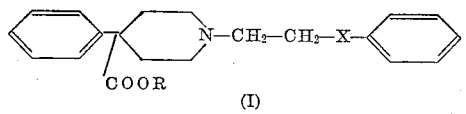

wherein R is a lower alkyl radical having from one to three carbon atoms, and X is a bi-valent, connecting radical chosen from the groups consisting of >C=O, >CHOH, >CHOOCCH$_3$, >CHOOCC$_2$H$_5$ and

>CHOOCC$_3$H$_7$

The pharmaceutically acceptable acid addition salts of the bases represented by the above formula are also included within the scope of this invention. Among the acids which form pharmaceutically acceptable acid addition salts are inorganic acids such as hydrochloric, hydrobromic, sulfuric acid, and the like, and organic acids such as tartaric, maleic, acetic acid, and the like.

The free bases of this invention are heavy viscous oils but the acid addition salts, particularly the hydrochloride salts are white, crystalline solids which melt in the neighborhood of 175° C. The salts generally are quite soluble in water and in the more polar oxygenated, organic solvents, such as methanol and ethanol.

When X in the above formula is a >C=O connecting radical, the compounds represented by the formula are γ-aminoketones. Such ketones are prepared by reacting an appropriately substituted piperidine with paraformaldehyde and acetophenone in the presence of concentrated hydrochloric acid. The reaction which takes place under these conditions is indicated by the following equation wherein R has the same significance as in the above general formula:

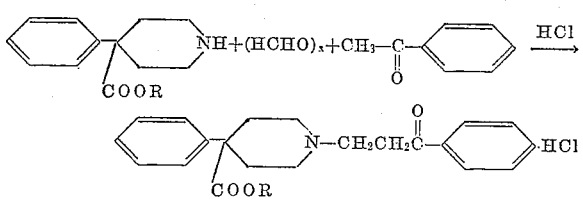

When X in the above general formula is >CHOH, the compounds are γ-amino alcohols. Such alcohols are prepared by reducing by catalytic or other means the γ-aminoketones described above.

The acyl derivatives of the γ-amino alcohols are prepared therefrom by acylation methods well known to the art, such as reaction of the alcohol with an acid anhydride in the presence of pyridine.

The compounds provided by this invention are potent analgesic substances and demonstrate their analgesic activity at doses well below those which show toxic side effects. The compounds can be administered parenterally by employing as the dosage form, a solution of a pharmaceutically acceptable acid addition salt of the piperidine base. In addition, solid dosage forms can be employed for oral administration, such comprising filled capsules, tablets, and the like. In general, single dose amounts employed for producing analgesia do not exceed about 250 mg.

This invention is further illustrated by the following specific examples.

EXAMPLE 1

*Preparation of β-(4-carboethoxy-4-phenylpiperidino)-propiophenone*

A reactive mixture was prepared containing 9.9 g. of 4-carboethoxy-4-phenylpiperidine hydrochloride, 1.8 g. of paraformaldehyde, 5 g. of acetophenone, 50 ml. of anhydrous ethanol and two drops of 12 N. hydrochloric acid. This mixture was heated to refluxing temperature for about one hour. An additional amount of 1.8 g. of paraformaldehyde was then added, and the reaction mixture was refluxed for about 18 more hours. The reaction mixture was evaporated to dryness in vacuo, and the residue containing β-(4-carboethoxy-4-phenylpiperidino)-propiophenone hydrochloride formed in the above reaction, was dissolved in about 100 ml. of water. The resulting solution was extracted once with about 100 ml. of ether, and the ether layer was separated and discarded. The acid, aqueous layer was made alkaline with 5% ammonium hydroxide to liberate the free base, β-(4-carboethoxy-4-phenylpiperidino)-propiophenone. The alkaline mixture was extracted with about 100 ml. of ether, and the free base, which was insoluble in alkaline solution, dissolved in the ether layer. The ether layer was separated and was dried. About 12 ml. of acetic anhydride was added to the dried ether solution to form an acetamide with and unreacted 4-carboethoxy-4-phenylpiperidine which was the starting material for the initial reaction. The amide thus prepared could not form a hydrochoride salt in the next step of the purification procedure and therefore could readily be separated from the desired product at this point. The reaction mixture was concentrated to about ¼ its original volume by warming it to about 100° C. The concentrate containing both β-(4-carboethoxy-4-phenylpiperidine)-propiophenone, and the acetamide by-product was saturated with anhydrous gaseous hydrogen chloride to yield crystalline β-(4-carboethoxy-4-phenylpiperidino)-propiophenone hydrochloride which was isolated by filtration. β-(4-carboethoxy-4-phenylpiperidine)-propiophenone hydrochloride melted at about 175–176° C. after being recrystallized three times from a mixture of methanol and ethyl acetate.

*Analysis.*—Calculated: C, 68.73; H, 7.02; Cl, 8.82. Found: C, 68.47; H, 7.24; Cl, 9.12.

Other lower alkyl esters derived from 4-phenyl-isonipectoic acid such as 4-carbomethoxy-4-phenylpiperidine and 4-carbopropionoxy-4-phenylpiperidine can be employed in place of 4-carboethoxy-4-phenylpiperidine in the above example, to provide the corresponding methyl and propyl ester derivatives.

EXAMPLE 2

*Preparation of 3-(4-carboethoxy-4-phenylpiperidino)-1-phenyl-1-propanol*

A reaction mixture was prepared containing 4 g. of β-(4-carboethoxy-4-phenylpiperidino)-propiophenone hydrochloride, 100 ml. of methanol and about 0.5 g. of platinum oxide catalyst. The mixture was placed in a low pressure hydrogenation apparatus and was hydrogenated at a temperature of about 27° C. and a pressure of about 3.5 atmospheres of hydrogen to convert the keto group of the β-(4-carboethoxy-4-phenylpiperidino)- propiophenone to an hydroxy group, and to form 3-(4-carboethoxy-4-phenylpiperidino)-1-phenyl-1-propanol hydrochloride. After the hydrogenation was complete, the catalyst was separated from the reaction mixture by filtration, and the filtrate was evaporated to dryness in vacuo leaving a residue containing 3-(4-carboethoxy-4-phenylpiperidino) - 1 - phenyl-1-propanol hydrochloride. The residue was digested with ethyl acetate thereby causing 3-(4-carboethoxy-4-phenylpiperidino)-1-phenyl-1-propanol hydrochloride to crystallize. This compound melted at about 188–189° C. after being recrystallized three times from an ethyl acetate-methanol solvent mixture.

*Analysis.*—Calculated: C, 68.38; H, 7.49; Cl, 8.78. Found: C, 68.12; H, 7.51; Cl, 8.69.

EXAMPLE 3

*Preparation of 1-acetoxy-3-(4-carboethoxy-4-phenylpiperidino)-1-phenylpropane*

A reaction mixture was prepared containing 1.6 g. of 3 - (4 - carboethoxy - 4 - phenylpiperidino) - 1 - phenyl-1-propanol hydrochloride, 3.2 ml. acetic anhydride and 9 ml. of anhydrous pyridine. The reaction mixture was heated at about 90° C. for one hour, thus forming 1-acetoxy - 3- ( 4 - carboethoxy - 4 - phenylpiperidino) - 1-phenylpropane hydrochloride. The pyridine solvent and the excess of acetic anhydride were removed by evaporation in vacuo. The resulting residue was digested with ether thus forming crystalline 1-acetoxy-3-(4-carboethoxy 4-phenylpiperidino)-1-phenylpropane hydrochloride. 1-acetoxy - 3 - (4 - carboethoxy - 4 - phenylpiperidino) - 1-phenylpropane hydrochloride thus prepared melting at about 202–203° C. after being recrystallized three times from an ethyl acetate-methanol solvent mixture.

*Analysis.*—Calculated: C, 67.32; H, 7.23; Cl, 7.95. Found: C, 67.11; H, 7.37; Cl, 7.91.

Other compounds acylated on the hydroxyl group α to the phenyl ring can be prepared in the same manner as described above by substituting a different acid anhydride for acetic anhydride in the above example. Thus, by following the above procedure there can be prepared 1-propionoxy-3-(4-carboethoxy-4-phenylpiperidino)-1-phenylpropane and 1-butyroxy-3-(4-carboethoxy-4-phenylpiperidino)-1-phenylpropane.

I claim:

1 - acetoxy - 3 - (4 - carboethoxy - 4 - phenylpiperidino)-1-phenylpropane.

References Cited in the file of this patent

Perrine et al.: J. Org. Chem., vol. 21, p. 125 (1956).

Weijlard et al.: vol. 78, J. Am. Chem. Society, pp. 2342–43, May 20, 1956.